W. P. TARRANT.
VALVE FOR MOLTEN SOLIDS.
APPLICATION FILED MAR. 17, 1914.
1,123,817.
Patented Jan. 5, 1915.
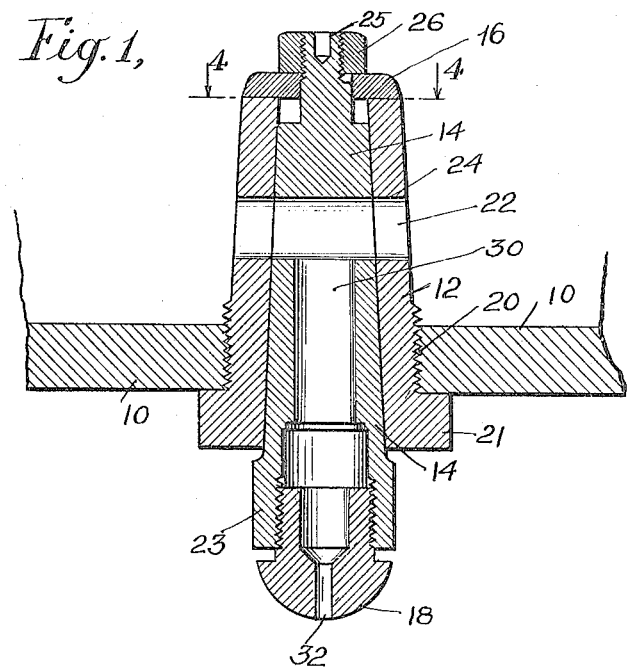
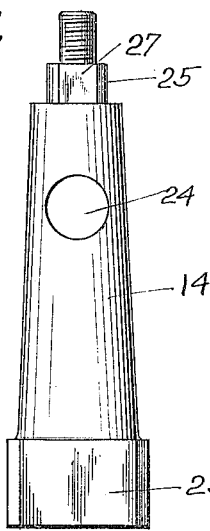
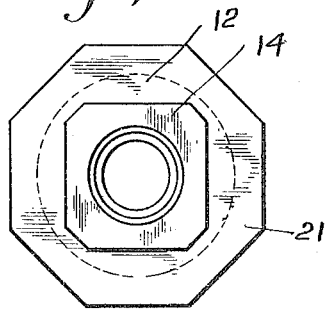
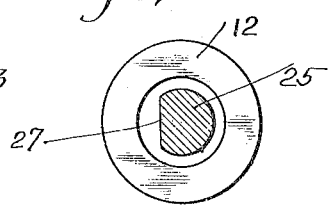
WITNESSES
INVENTOR
William P. Tarrant
BY
E. W. Marshall
ATTORNEY

UNITED STATES PATENT OFFICE.

WILLIAM P. TARRANT, OF SARATOGA SPRINGS, NEW YORK.

VALVE FOR MOLTEN SOLIDS.

1,123,817.  Specification of Letters Patent.  Patented Jan. 5, 1915.

Application filed March 17, 1914. Serial No. 825,375.

*To all whom it may concern:*

Be it known that I, WILLIAM P. TARRANT, a citizen of the United States of America, and a resident of Saratoga Springs, Saratoga county, and State of New York, have invented certain new and useful Improvements in Valves for Molten Solids, of which the following is a specification, reference being had to the accompanying drawing, forming a part thereof.

Certain solids are commonly distributed in a heated or molten condition from a tank or receptacle, an example of such use being the distribution of hot asphalt or other bituminous materials through nozzles onto a road bed. The valves, nozzles, and other fixtures through which this material flows becomes almost immediately clogged up as soon as the flow is stopped, because of the fact that the material in such fixtures congeals and solidifies.

This invention relates to valves or taps for use with such materials, and its object is to provide a simple and durable structure which shall be particularly arranged and adapted to operate under such severe service conditions.

In order that my invention may be thoroughly understood I will now proceed to describe the same in the following specification and then point out the novel features thereof in appended claims.

Referring to the drawings: Figure 1 is a longitudinal section of a valve arranged and constructed in accordance with my invention. The valve plug is shown in side elevation in Fig. 2. Fig. 3 is an end view of the valve with the outlet bushing of the plug removed. Fig. 4 is a transverse sectional view taken on the line 4—4 of Fig. 1.

Like characters of reference designate corresponding parts in all the figures.

The valve of my invention may be secured in the bottom or wall 10 of any suitable tank or receptacle and comprises in general, a casing 12, a plug 14 therein, a thrust collar 16 and a nozzle 18. The casing 12 has the form of a tapered socket and is provided with a threaded outer surface 20 which is adjacent to a polygonal flange 21. Its inner surface is frusto-conical and a transverse opening 22 extends through its walls. The plug 14 has a square head 23 and is tapered to fit into the frusto-conical opening in the casing 12. It also has a transverse opening 24 which is adapted to register with the opening 22 as shown in Fig. 1. A relatively small bolt or pin projection 25 extends from the inner end of the plug 14 through the thrust collar 16 and has a nut 26 screwed into the outer end. The collar is prevented from turning by a flat surface 27 on the projection with which it engages. The plug 14 has also a longitudinal opening or passage 30 which communicates with the transverse passage 24 and is enlarged and tapped, near the outer end of the plug, to receive the nozzle 18. The nozzle has a spherically curved head and a screw-threaded projection which enters the opening in the plug. It is provided with a slot or passage 32 from which asphalt or like material is discharged. It is only necessary to provide a tapped hole in the tank or receptacle into which the casing 12 may be screwed. The nut 26 draws the plug into the casing and the end of the bolt projection 25 is preferably riveted to prevent the removal of the nut. The square head of the plug constitutes a ready means by which the plug may be turned in the casing or socket, to open or close the valve.

When the valve plug is in the position shown in Fig. 1 the hot liquid in the tank flows outwardly through passages 22, 24, 30 and 32, being discharged from the nozzle as already explained. The bulk of the valve is located within, or in engagement with, the receptacle and by this means the whole is kept hot so long as there is hot material in the tank or receptacle. Thus this valve may be turned off and on at will and the material in it will not solidify and clog the passages as is common with such valves as have been used heretofore which have to be heated by some external means before they can be used. Furthermore, because of the very severe conditions under which my valve is adapted to operate, I have employed a very few simple parts in its construction. For example, I have omitted anything corresponding to the usual faucet arm or valve stem which are liable to be bent or broken. Any suitable wrench or means may be utilized to turn the valve plug on and off.

Variations in size and arrangement of parts may be effected within the spirit and scope of my invention, and I intend that only such limitations be imposed as are indicated in the appended claims.

What I claim is:

1. A valve for molten solids comprising a relatively massive casing or socket of metal adapted to be secured in the wall of a tank and extend largely into said tank to be heated by the molten solid therein, a valve plug arranged to rotate loosely in the casing or socket and having a longitudinal opening, and a nozzle removably secured to the valve plug in substantial alinement with the plug, said casing or socket and said valve plug having a relatively large transverse opening communicating with the longitudinal opening in the plug.

2. A valve for molten solids comprising a casing or socket of metal adapted to be secured in the wall of a tank and extend largely into said tank to be heated by the molten solid therein, a valve plug fitted into the casing or socket having relatively large openings within the tank and said plug having relatively large longitudinal and transverse passages adapted to communicate with said openings, and a nozzle screwed into the outer end of said plug and having a relatively small passage in alinement with the longitudinal passage of the plug and forming a continuation thereof.

3. A valve for molten solids comprising a casing or socket of metal adapted to be secured in the wall of a tank and extend largely into said tank, a valve plug fitted into the casing or socket and arranged to turn freely therein, said casing or socket having openings within the tank and said plug having a longitudinal passage adapted to communicate with said openings, and a relatively small nozzle having a spherically curved end, and a screw-threaded projection adapted to be secured into the outer end of the longitudinal passage through the plug.

In witness whereof I have hereunto set my hand this 13th day of March, 1914, in the presence of two subscribing witnesses.

WILLIAM P. TARRANT.

Witnesses:
WILLIAM R. WILSON,
JESSE L. COOPER.

Copies of this patent may be obtained for five cents each, by addressing the "Commissioner of Patents, Washington, D. C."